(12) United States Patent
Tanaka

(10) Patent No.: US 12,056,345 B2
(45) Date of Patent: Aug. 6, 2024

(54) MATRIX OPERATION METHOD, ELECTRONIC DEVICE AND STORAGE MEDIUM

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/075,801

(22) Filed: Dec. 6, 2022

(65) Prior Publication Data

US 2023/0185445 A1 Jun. 15, 2023

(30) Foreign Application Priority Data

Dec. 10, 2021 (JP) ................................ 2021-200515

(51) Int. Cl.
G06F 3/0488 (2022.01)
G06F 3/041 (2006.01)
G06F 3/04845 (2022.01)

(52) U.S. Cl.
CPC .......... *G06F 3/0488* (2013.01); *G06F 3/0416* (2013.01); *G06F 3/04845* (2013.01)

(58) Field of Classification Search
CPC ... G06F 3/0488; G06F 3/0416; G06F 3/04845
See application file for complete search history.

(56) References Cited

U.S. PATENT DOCUMENTS

| 2008/0291171 | A1* | 11/2008 | Shin ...................... G06F 3/0486 345/173 |
| 2010/0070931 | A1* | 3/2010 | Nichols ................. G06F 3/0488 715/863 |
| 2011/0115702 | A1 | 5/2011 | Seaberg |
| 2012/0274579 | A1* | 11/2012 | Ikeda ................... G06F 3/04886 345/173 |
| 2016/0239200 | A1 | 8/2016 | Fang |
| 2016/0378282 | A1* | 12/2016 | Sagong ................. G06F 3/0482 715/765 |
| 2018/0260545 | A1* | 9/2018 | Chen ........................ G06F 21/32 |
| 2020/0089362 | A1 | 3/2020 | Choi et al. |

FOREIGN PATENT DOCUMENTS

| JP | 2000181873 A | * | 6/2000 |
| JP | 2012243015 A |   | 12/2012 |

OTHER PUBLICATIONS

Extended European Search Report dated Apr. 6, 2023 received in European Patent Application No. EP 22209081.3.
Notice of Reasons for Refusal dated Oct. 24, 2023 received in Japanese Patent Application No. JP 2021-200515.

* cited by examiner

*Primary Examiner* — Michael J Jansen, II
*Assistant Examiner* — Sosina Abebe
(74) *Attorney, Agent, or Firm* — Scully, Scott, Murphy & Presser, P.C.

(57) ABSTRACT

A matrix operation method performed by a computer includes the following, displaying on a display a matrix in which a plurality of components are arrayed; and changing an arrangement of at least one of the plurality of components in the matrix displayed on the display based on a gesture operation to the matrix.

17 Claims, 13 Drawing Sheets

FIG.3

$$\begin{bmatrix} 1 & 2 & 3 \\ 4 & 5 & 6 \end{bmatrix} \Rightarrow \begin{bmatrix} 4 & 1 \\ 5 & 2 \\ 6 & 3 \end{bmatrix}$$

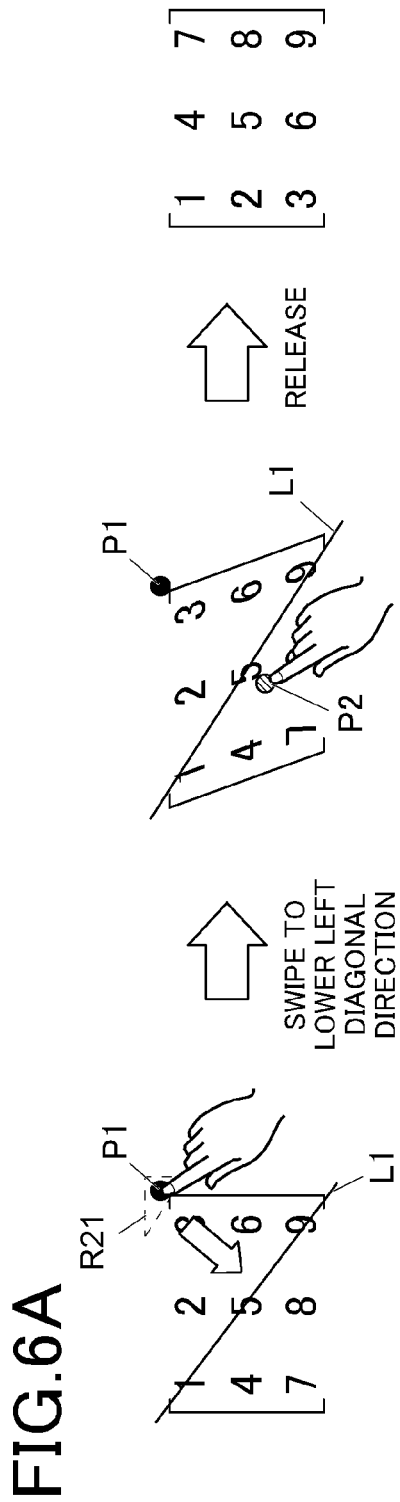

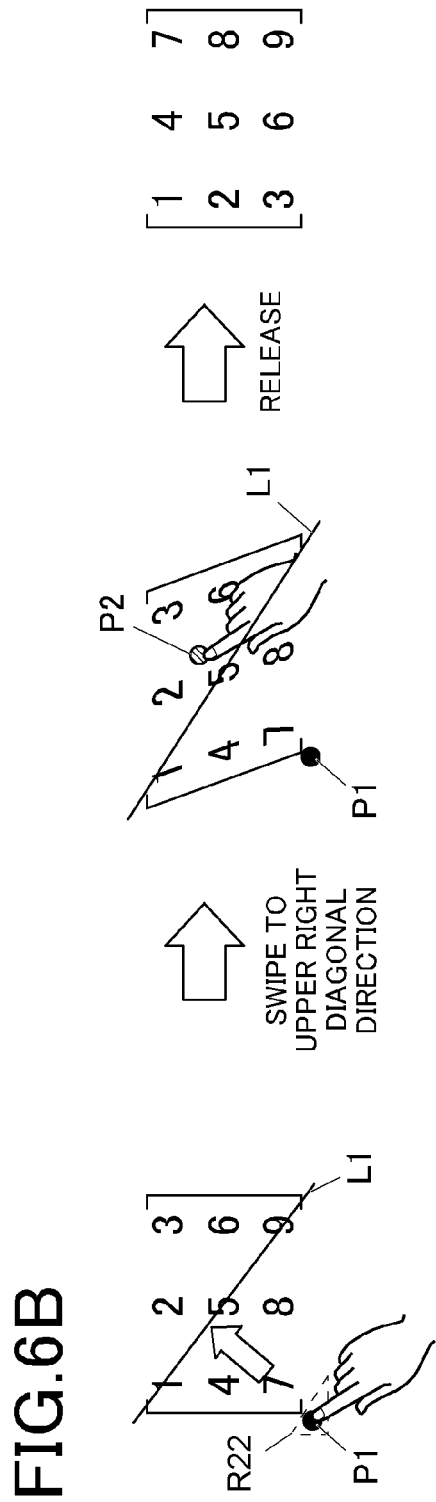

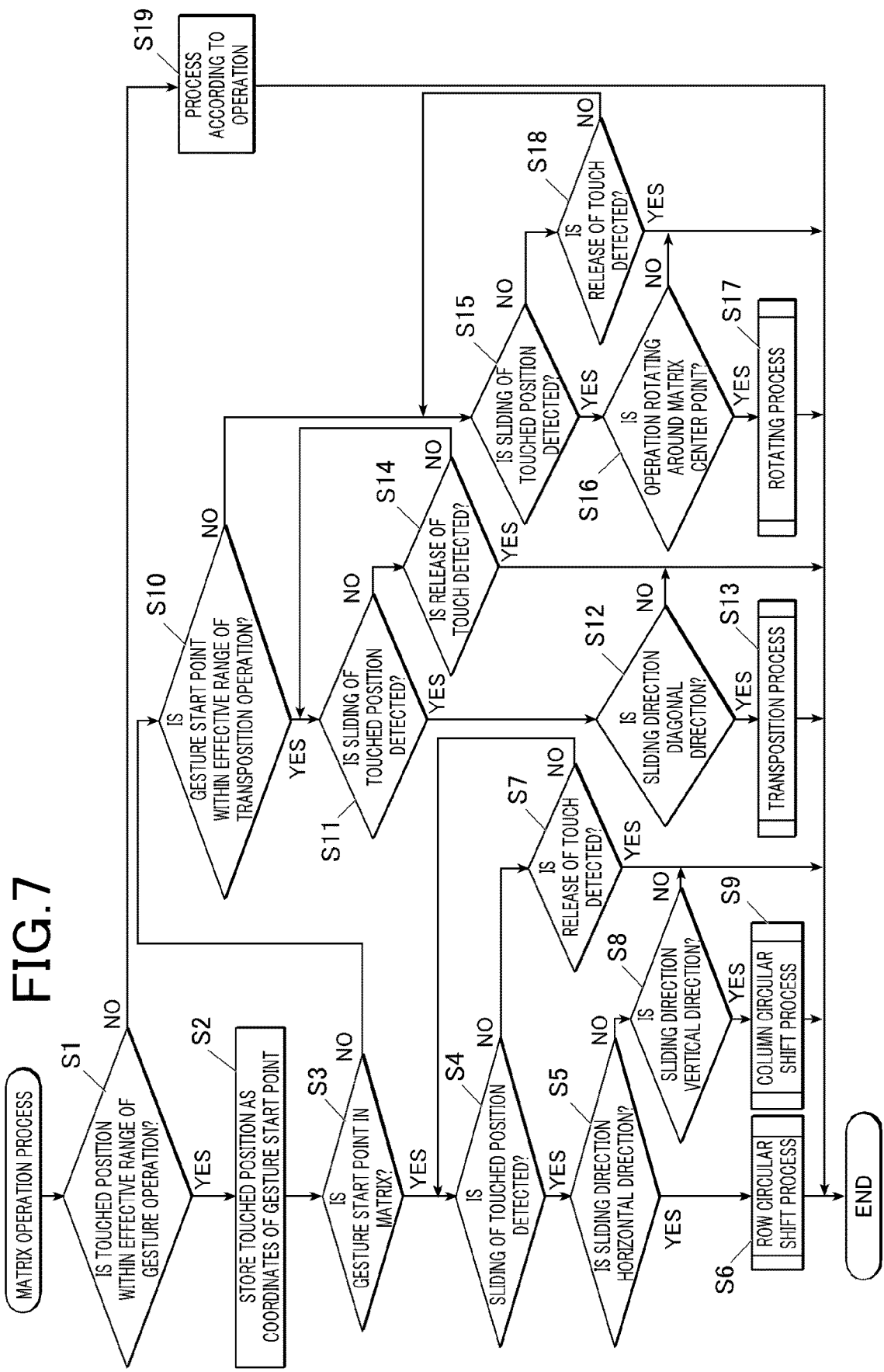

MATRIX OPERATION METHOD, ELECTRONIC DEVICE AND STORAGE MEDIUM

REFERENCE TO RELATED APPLICATIONS

This application is based upon and claims the benefit of priority under 35 USC 119 of Japanese Patent Application No. 2021-200515, filed on Dec. 10, 2021, the entire disclosure of which, including the description, claims, drawings, and abstract, is incorporated herein by reference in its entirety.

TECHNICAL FIELD

The present disclosure relates to a matrix operation method, an electronic device and a storage medium.

DESCRIPTION OF RELATED ART

Conventionally, there are electronic calculators that are equipped with a matrix calculation function in which matrices are input and calculations are performed in addition to the usual four arithmetic functions.

There are also known devices that can perform elementary matrix transformations (row and column operations). For example, JP 2012-243015 describes an apparatus configured to display a matrix and a list of row operation functions related to the matrix, and to perform the row operation according to selection of the equation or entering a numeric value necessary to perform the row operation function that is touched on the list.

In recent years there is a scientific calculator Web application or a scientific calculator application that is operated on a device in which touch operation is possible.

SUMMARY OF THE INVENTION

A matrix operation method performed by a computer, the method including: displaying on a display a matrix in which a plurality of components are arrayed; and changing an arrangement of at least one of the plurality of components in the matrix displayed on the display based on a gesture operation to the matrix.

BRIEF DESCRIPTION OF DRAWINGS

FIG. 3 is a diagram showing an example of rotating a matrix with 2 rows and 3 columns 90° clockwise.

FIG. 6A is a diagram schematically showing a transposition operation.

FIG. 6B is a diagram schematically showing a transposition operation.

FIG. 7 is a flowchart showing a flow of a matrix operation process executed by the controller shown in FIG. 1.

DETAILED DESCRIPTION

Hereinafter, embodiments are described with reference to the drawings. However, various limitations that are technically preferable to execute the present disclosure are described in the embodiments below. Therefore, the technical scope of the present disclosure is not limited to the embodiments described below and the illustrated examples.

[Configuration of Electronic Device 100]

First, the configuration of the electronic device 100 according to the present embodiment is described.

Figure 1:
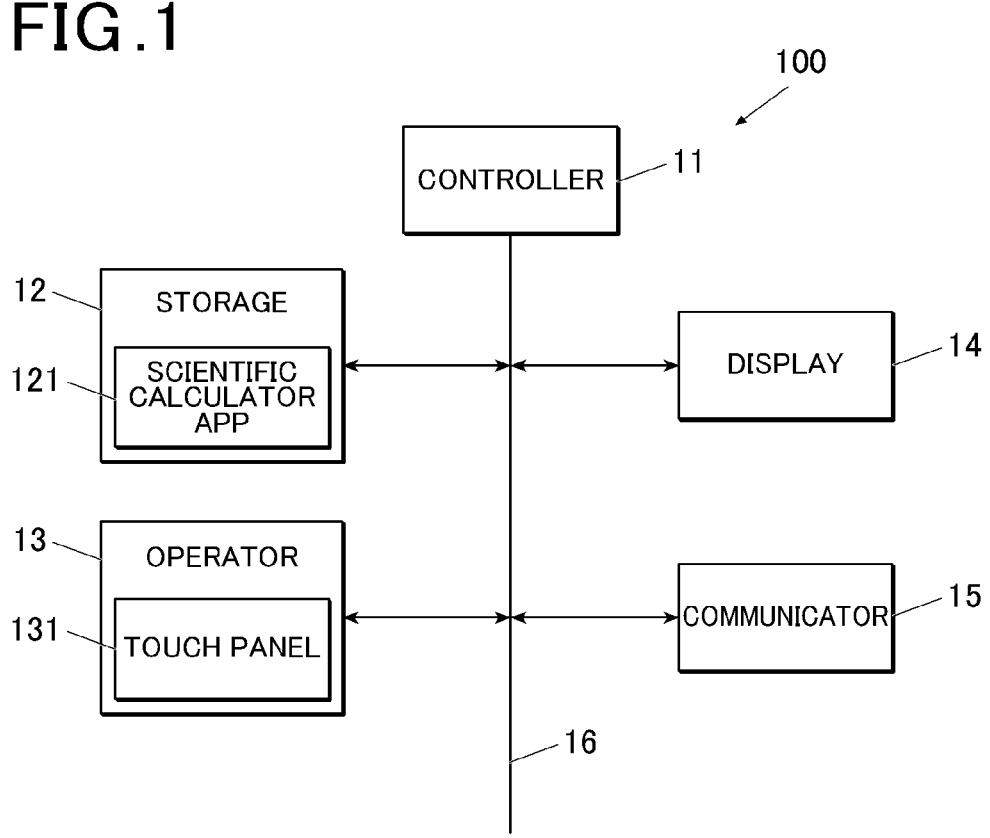
FIG. 1 is a block diagram showing a functional configuration of an electronic device according to the present embodiment.

FIG. 1 is a block diagram showing a functional configuration of an electronic device 100 according to the present embodiment. For example, the electronic device 100 may be a tablet terminal, a smartphone, a PC (Personal Computer), or the like including a scientific calculator application (referred to as a scientific calculator app) 121 or may be an apparatus dedicated to calculation. The form is not limited.

As shown in FIG. 1, the electronic device 100 includes a controller (hardware processor) 11, a storage 12, an operator 13, a display 14, and a communicator 15, and the units are connected to each other through a bus 16.

The controller 11 includes a central processing unit (CPU), a read only memory (ROM), a random access memory (RAM), and the like. The CPU of the controller 11 reads programs and data stored in the ROM and the storage 12. The RAM is used as the work area for the CPU. The CPU executes various processes to centrally control the units of the electronic device 100.

The storage 12 includes a nonvolatile semiconductor memory, a hard disk, and the like. The storage 12 stores various programs and data used in the program.

According to the present embodiment, a scientific calculator app 121 is stored in the storage 12. The scientific calculator app 121 is an application program for the controller 11 to execute various processes regarding the calculation including the matrix operation process described later.

The operator 13 includes a touch panel 131 formed overlapped on a screen of the display 14. The operator 13 may further include various operation buttons. The operation of the operation buttons and the operation on the screen of the display 14 are detected and such operation information is output to the controller 11.

The display 14 includes a Liquid Crystal Display (LCD), an Electro-Luminescence (EL) display, and the like, and various display is performed according to display information instructed from the controller 11.

The communicator 15 controls communication to perform communication with external devices through a communication network such as a LAN (Local Area Network) or the internet.

[Operation of Electronic Device 100]

Next, the operation of the electronic device 100 is described.

In the electronic device 100, when a start operation of the scientific calculator app 121 is detected by the operator 13, the controller 11 starts the scientific calculator app 121 and performs the following process in coordination with the scientific calculator app 121.

For example, when the scientific calculator app 121 is started by user operation on the operator 13, the controller 11 controls the display 14 to display the input screen. When the input instruction of the matrix is detected by the touch panel 131, and each component of the matrix is input, the controller 11 displays the matrix on the display 14. When the touch panel 131 detects the input of an arithmetic formula including the matrix and the instruction to execute the process is made, the controller 11 performs an arithmetic process based on the input and an arithmetic result is displayed on the display 14.

Here, the matrix is an array of a plurality of components (factors).

The electronic device 100 according to the present embodiment is able to change at once an arrangement of a plurality of components in the matrix displayed on the display 14 according to operation of a gesture by the user to the matrix. For example, according to the gesture operation by the user to the matrix, rotation, circular shift, and transposition of the components in the matrix can be performed. The gesture operation by the user to rotate the position of each component in the matrix is called a rotating operation. The gesture operation by the user to move the components in a row or column of the matrix in a circular shift movement (referred to as circular shift) is called a circular shift operation. The gesture operation by the user to perform transposition movement (referred to as "transposition") by switching the component of the row and the component of the column in the matrix is called a transposition operation.

(Rotating Operation)

Figure 2:
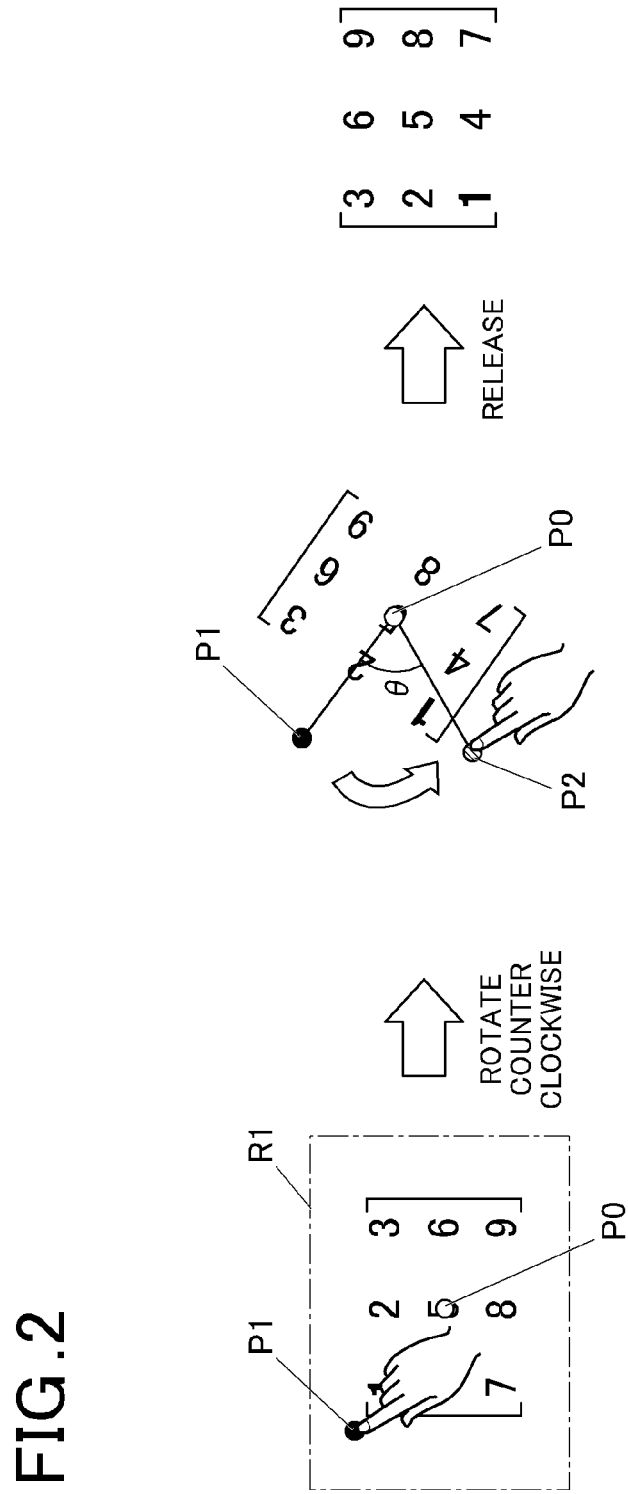
FIG. 2 is a diagram schematically showing a rotating operation.

For example, when a matrix is displayed on the display 14, as shown in FIG. 2, the controller 11 sets an effective range R1 around the displayed matrix and the effective range R1 is the range that is effective to start the rotating operation on the matrix. According to the present embodiment, the range that is set as the effective range R1 to start the rotating operation is a predetermined range around the matrix (not including the area on the matrix), for example an area that is away a distance between the factors (distance between rows dRow or distance between columns dCol shown in FIG. 4 and FIG. 5) from the outer perimeter of the matrix (for example, a quadrilateral including line segments connecting the point positioned at the top right of the matrix components including parentheses, the point positioned at the top left, the point positioned at the bottom left and the point positioned at the bottom right). A center point of the displayed matrix is set as a matrix center point P0. According to the present embodiment, a region excluding a range that is effective to start a later-described transposition operation from a predetermined range around the matrix (not including the area on the matrix) may be set as the effective range to start the rotating operation.

When the touch panel 131 detects that the area within the effective range R1 to start the rotating operation is touched, the controller 11 obtains the touched position (coordinates) as a gesture start point P1.

When the touch panel 131 detects that the user rotates and slides the finger (touched position) clockwise or counter clockwise around a center point P0 from the gesture start point P1, the controller 11 obtains the rotating angle (counter clockwise is positive and clockwise is negative) up to the present point. Then, as shown in FIG. 2, the entire matrix which is the target of operation is displayed rotated in a predetermined angle according to the rotating angle. With this, it is possible for the user to easily understand how many degrees the user rotated the touched position. Each time the touched position is rotated a predetermined angle or more (for example, each time the position is rotated equal to or more than 45°, 135°, 225°, and 315°), the position of each component of the matrix may be rotated a predetermined angle at a time (for example, 90° at a time), and the display may be performed so that the user is able to understand how much each component of the matrix is rotated by the rotating operation at the present point.

When the touch panel 131 detects that the user releases the finger from the screen, the controller 11 obtains the released position (coordinates) as a gesture end point P2, and obtains the angle formed by the gesture start point P1, the matrix center point P0 and the gesture end point P2 as the rotating angle θ (counter-clockwise is positive, clockwise is negative). Then, as shown in FIG. 2, the controller 11 rotates the position of each component in the matrix that is the target of operation a predetermined angle based on the rotating angle θ, and displays the result on the display 14.

For example, according to the rotating angle θ, the controller 11 rotates each component of the matrix as follows.

$0° < θ ≤ 45°$: No rotation
$45° < θ ≤ 135°$: Rotate counter clockwise 90°
$135° < θ ≤ 225°$: Rotate counter clockwise 180°
$225° < θ ≤ 315°$: Rotate counter clockwise 270°
$315° < θ ≤ 360°$: Rotate counter clockwise 360° (that is, no rotation)
$0° < θ ≤ -45°$: No Rotation
$-45° < θ ≤ -135°$: Rotate clockwise 90°
$-135° < θ ≤ -225°$: Rotate clockwise 180°
$-225° < 0 ≤ -315°$: Rotate clockwise 270°
$-315° < θ ≤ -360°$: Rotate clockwise 360° (that is, no rotation)

When θ is larger than 360°, θ is divided by 360, and the rotation is made so as the remainder is θ. When θ is smaller than −360°, −θ is divided by 360, and the rotation is made so as the remainder multiplied by −1 is θ.

FIG. 3 shows an example of a matrix drawn on the display 14 when the user performs a rotating operation in which the user touches the effective range to start the rotating operation on a matrix with 2 rows and 3 columns, and the touched position is rotated 90° in the clockwise direction and then released.

As described above, by performing the rotating operation, the positions of a plurality of components in the matrix can be rotated with one operation by performing a gesture operation such as to touch the surroundings of the matrix and to swipe in the rotating direction around the matrix center point P0. With this, the matrix components can be moved by rotation quickly by an intuitive operation without operating an icon, a functional button or a menu.

(Circular Shift Operation)

Figure 4:
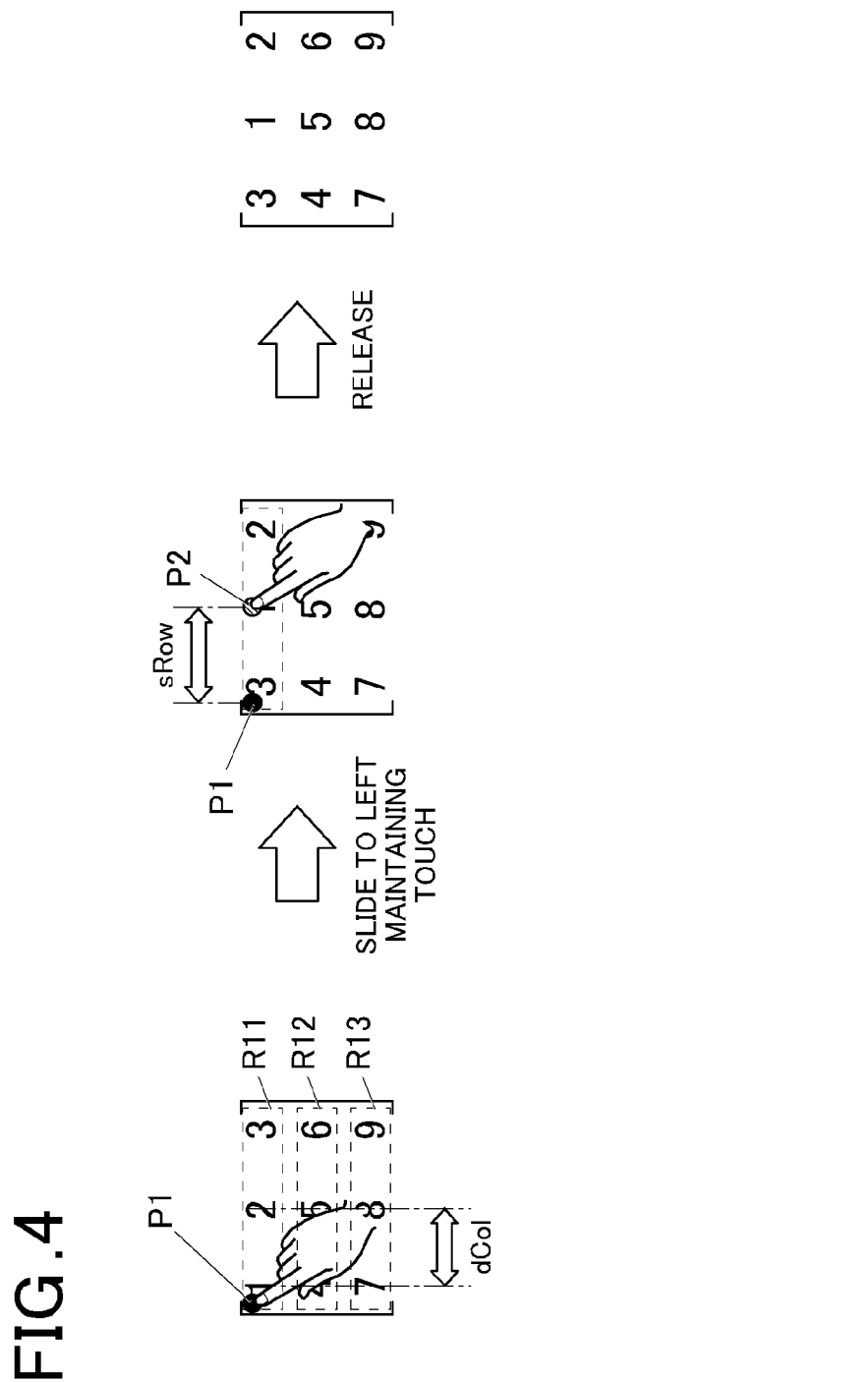
FIG. 4 is a diagram schematically showing a circular shift operation of a row.
Figure 5:
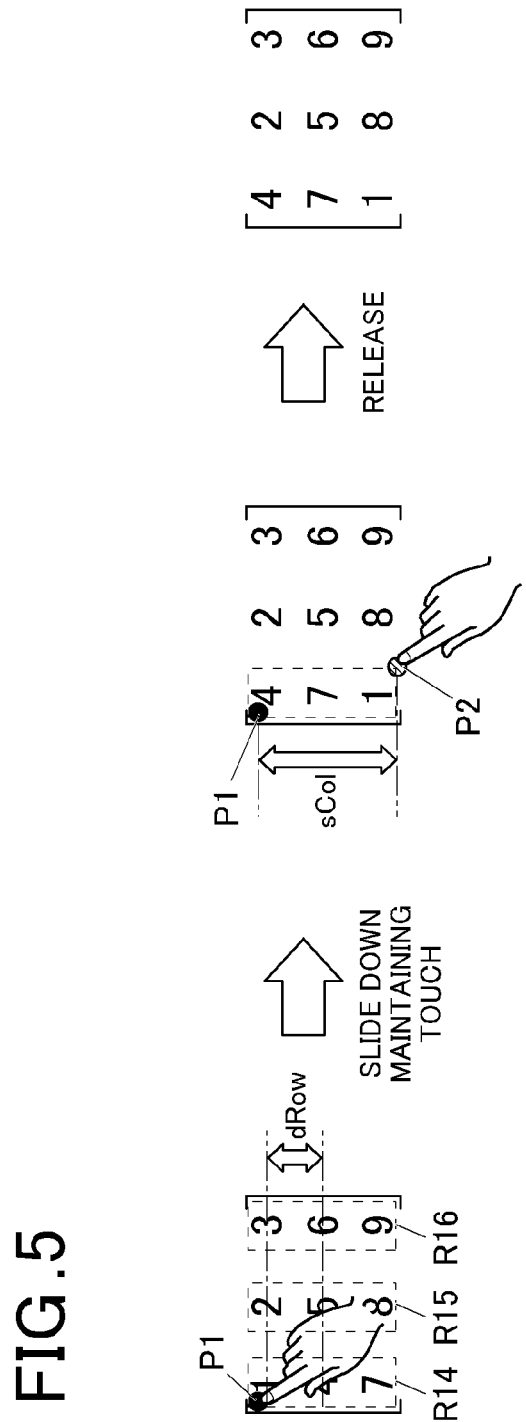
FIG. 5 is a diagram schematically showing a circular shift operation of a column.

For example, when the matrix is displayed on the display 14, as shown with dotted lines in FIG. 4 and FIG. 5, the controller 11 sets an effective range in the displayed matrix so as to make the start of the operation of the circular shift in each row and each column effective (for example, R11 to R16 in the example shown in FIG. 4 and FIG. 5).

According to the present embodiment, the circular shift of the row in the matrix is to shift the components in a certain row of the matrix in a horizontal direction (right or left), and the pushed out component is moved to a vacant portion. For example, when components in a certain row is (1, 2, 3), when the row is shifted circularly in an amount of 1, the components in the row become (3, 1, 2). When the row is shifted circularly in the amount of 2, the components in the row become (2, 3, 1).

The circular shift of the column in the matrix is to shift the components in a certain column of the matrix in a vertical direction (up or down), and the pushed out component is moved to a vacant portion. For example, when components in a certain column is from the top (1, 2, 3), when the column is shifted circularly downward in an amount of 1, the components in the column become from the top, (3, 1, 2). When the column is shifted circularly downward in an amount of 2, the components in the column become from the top, (2, 3, 1).

According to the present embodiment, inside the region in the matrix surrounding the components of each row (for example, R11 to R13 in FIG. 4) is set as the effective range to start the circular shift operation in each row. For example, the outer perimeter of the effective range to start the circular shift operation in each row is set so as to surround the components of each row and so as to be on the inner side of the region surrounded by the parentheses of the matrix. The outer perimeter is set so as not to overlap with the effective range of the other rows. For example, the outer perimeter of the effective range in the portion between the first and second rows is on the inner side than ½ dRow. Inside the region in the matrix surrounding the components of each column (for example, R14 to R16 in FIG. 5) is set as the effective range to start the circular shift operation in each column. For example, the outer perimeter of the effective range to start the circular shift operation in each column is set so as to surround the components of each column and so as to be on the inner side of the region surrounded by the parentheses of the matrix. The outer perimeter is set so as not to overlap with the effective range of the other columns. For example, the outer perimeter of the effective range in the portion between the first and second columns is on the inner side than ½ dCol. In one embodiment, the above-described effective range to start the circular shift operation is a rectangular range.

When the touch panel 131 detects that any row or column in the effective range to start the circular shift operation is touched by the user, the controller 11 obtains the touched position (coordinates) as the gesture start point P1.

As shown in FIG. 4, when it is detected by the touch panel 131 that the user slides (moves) the finger (touched position) in the horizontal direction from the gesture start point P1, the controller 11 obtains the distance that the user slides the finger horizontally (horizontal sliding distance sRow) and the sliding direction (right or left). Then, the controller 11 displays on the display 14 the components of the row operated by sliding horizontally in the matrix that is the operation target circularly shifted according to the horizontal sliding distance sRow and the sliding direction. The result is displayed on the display 14. With this, the user is able to easily understand how the circular shift in the row is performed by the horizontal sliding of the touched position performed at the present point.

When the touch panel 131 detects that the user released the finger from the screen, the controller 11 obtains the released position (coordinates) as a gesture end point P2. Then, as shown in FIG. 4, according to the horizontal sliding distance sRow between the gesture start point P1 and the gesture end point P2 and the sliding direction, the components of the row operated by horizontally sliding the matrix that is the operation target is circularly shifted in a predetermined shifting amount in a predetermined direction. Then, the result is displayed on the display 14.

For example, as described below, the controller 11 circularly shifts each component of the row operated in the matrix that is the operation target according to the horizontal sliding distance sRow and the sliding direction. Here, the distance between the columns of the components of the matrix is to be dCol and the number of columns in the matrix is to be N. Whether the sliding is to the right or to the left is determined by the sliding direction of the touched position.

0<sRow<0.5*dCol . . . : No sliding
0.5*dCol≤sRow<1.5*dCol: Slide 1 column right or left
1.5*dCol≤sRow<2.5*dCol: Slide 2 columns right or left
(n−0.5)*dCol≤sRow<(n+0.5)*dCol: Slide n columns right or left
(N−1.5)*dCol≤sRow<(N−0.5)*dCol: Slide N−1 columns right or left
(N−0.5)*dCol≤sRow: Slide N−1 columns right or left (slide up to maximum N−1 columns)

As shown in FIG. 5, when it is detected by the touch panel 131 that the user slides (moves) the finger (touched position) in the vertical direction from the gesture start point P1, the controller 11 obtains the distance that the user slides the finger vertically (vertical sliding distance sRow) and the sliding direction (up or down). Then, the controller 11 displays on the display 14 the components of the column operated by sliding in the matrix that is the operation target and that is displayed on the display 14 circularly shifted according to the vertical sliding distance sCol and the sliding direction. With this, the user is able to easily understand how the circular shift in the column is performed by the vertical sliding of the touched position performed at the present point.

When the touch panel 131 detects that the user released the finger from the screen, the controller 11 obtains the released position (coordinates) as a gesture end point P2. Then, according to the vertical sliding distance sCol between the gesture start point P1 and the gesture end point P2 and the sliding direction, the components of the column operated by vertically sliding the matrix that is the operation target is circularly shifted in a predetermined shifting amount in a predetermined direction. Then, the result is displayed on the display 14.

For example, as described below, the controller 11 circularly shifts each component of the column operated in the matrix that is the operation target according to the vertical sliding distance sCol. Here, the distance between the rows of the components of the matrix is to be dRow and the number of rows in the matrix is to be M. Whether to slide up or down is determined according to the sliding direction.

0<sCol<0.5*dRow: No sliding
0.5*dRow≤sCol<1.5*dRow: Slide 1 row up or down
1.5*dRow≤sCol<2.5*dRow: Slide 2 rows up or down
(m−0.5)*dRow≤sCol<(m+0.5)*dRow: Slide m rows up or down
(M−1.5)*dRow≤sCol<(M−0.5)*dRow: Slide M−1 rows up or down
(M−0.5)*dRow≤sCol: Slide M−1 rows up or down (slide up to maximum M−1 rows)

As described above, by performing the circular shifting operation, the positions of the plurality of components in the matrix can be circularly shifted with one operation by performing a gesture operation such as to touch the row or column that the user desires to circularly shift in the matrix and to swipe in the horizontal direction or the vertical direction. With this, the matrix components can be moved by circular shifting quickly by an intuitive operation without operating an icon, a functional button or a menu.

(Transposition Operation)

For example, when the matrix is displayed on the display 14, as shown in FIG. 6A and FIG. 6B, the controller 11 sets regions R21 and R22 with a predetermined size positioned in the upper right and the lower left of the displayed matrix (according to the present embodiment, triangle region outside matrix) as the effective range to start the transposition operation on the matrix. Moreover, a diagonal of the matrix (a line segment that passes components positioned in opposite angles, according to the present embodiment, the line segment that connects the upper left and the lower right of the matrix) is set to be a transposition boundary line L1.

For example, according to the present embodiment, the regions R21 and R22 are adjacent to the upper right and the lower left corner in the parentheses of the matrix. According to the present embodiment, the regions R21 and R22 may be adjacent to the component at the corner of the matrix. According to the present embodiment, the region R21 (or the region R22) is a triangle in which a line that passes the upper right (or lower left) corner of the parentheses of the matrix and that is substantially parallel with the transposition boundary line L1 is the base. For example, when the length of each side of the triangle is t, t may be set as $0.5*dCol \leq t < 1*dCol$.

According to the present embodiment, the size of the regions R21 and R22 is smaller than the size of the matrix (size of displayed appearance) and the size of the effective range R1, and the regions R21 and R22 are set on the inner side of the outer perimeter of the effective range R1.

According to the present embodiment, the regions R21 and R22 may be positioned at the upper left and the bottom right of the displayed matrix. For example, the region may be adjacent to the upper left and the lower right corner of the parentheses of the matrix, or the region may be adjacent to the component in the upper left and the lower right corner. In this case, the transposition boundary line L1 may be the line segment connecting the upper right and the lower left of the matrix.

When the touch panel 131 detects that the effective range R21 or R22 to start the transposition operation is touched, the controller 11 obtains the touched position (coordinates) as a gesture start point P1.

When the touch panel 131 detects that the user slides the finger (touched position) from the gesture start point P1 at the upper right in a diagonal direction, the controller 11 determines whether the touched position after the movement crossed the transposition boundary line L1. When the controller 11 determines that the line is crossed, the shape of the entire matrix that is the target of operation displayed on the display 14 is changed. For example, as shown in FIG. 6A and FIG. 6B, when the touched position after the movement crossed the transposition boundary line L1, the entire matrix is deformed diagonally (in a parallelogram shape) so that the user is able to understand that the line is crossed. With this, the user is able to easily understand whether the touched position crossed the transposition boundary line L1.

When the touch panel 131 detects that the user releases the finger from the screen, the controller 11 obtains the released position (coordinates) as the gesture end point P2, and determines whether the touched position crossed the transposition boundary line L1 from the coordinates of the gesture start point P1 and the gesture end point P2. When it is determined that the touched position crossed the transposition boundary line L1, the controller 11 exchanges the components of the row with the components of the column in the matrix that is the operation target, and creates the transposition matrix. The result is displayed on the display 14. Specifically, component (i, j) and component (i, j) are exchanged.

As described above, by performing the transposition operation, the positions of a plurality of components in the matrix can be transposed with one operation by performing a gesture operation such as to touch the upper right or the lower left of the matrix and to swipe in the diagonal direction until the touched position crosses the transposition boundary line L1. With this, the matrix components can be transposed quickly by an intuitive operation without operating an icon, a functional button or a menu.

(Matrix Operation Process)

FIG. 7 is a flowchart showing a flow of the matrix operation process performed by the controller 11 when the touch panel 131 detects being touched while the matrix is displayed on the display 14. The matrix operation process is performed by the controller 11 in coordination with the scientific calculator app 121 stored in the storage 12.

First, the controller 11 determines whether the touched position where the touch is detected by the touch panel 131 is within the effective range to start the gesture operation in the matrix (step S1).

The effective range to start the gesture operation includes the effective range of each of the rotating operation, the circular shift operation and the transposition operation.

When it is determined that it is within the effective range to start the gesture operation in the matrix (step S1; YES), the controller 11 stores in the RAM the coordinates of the touched position as the gesture start point (step S2).

Next, the controller 11 determines whether the gesture start point P1 is within the region of the matrix displayed on the display 14 (step S3).

When it is determined that the gesture start point P1 is within the region of the matrix displayed on the display 14 (step S3; YES), the controller 11 determines whether the sliding (moving) of the touched position is detected by the touch panel 131 (step S4).

When it is determined that the sliding of the touched position is not detected (step S4; NO), the controller 11 determines whether the release of the finger is detected by the touch panel 131 (step S7).

When it is determined that the release of the finger is not detected (step S7; NO), the controller 11 returns the process to step S4.

When it is determined that the release of the finger is detected (step S7; YES), the controller 11 ends the matrix operation process.

When it is determined that the sliding (moving) of the touched position is detected by the touch panel 131 (step S4; YES), the controller 11 determines whether the sliding direction is the horizontal direction (step S5).

When it is determined that the sliding direction is the horizontal direction (step S5; YES), the controller 11 performs the circular shift process of the row (step S6).

Figure 8:
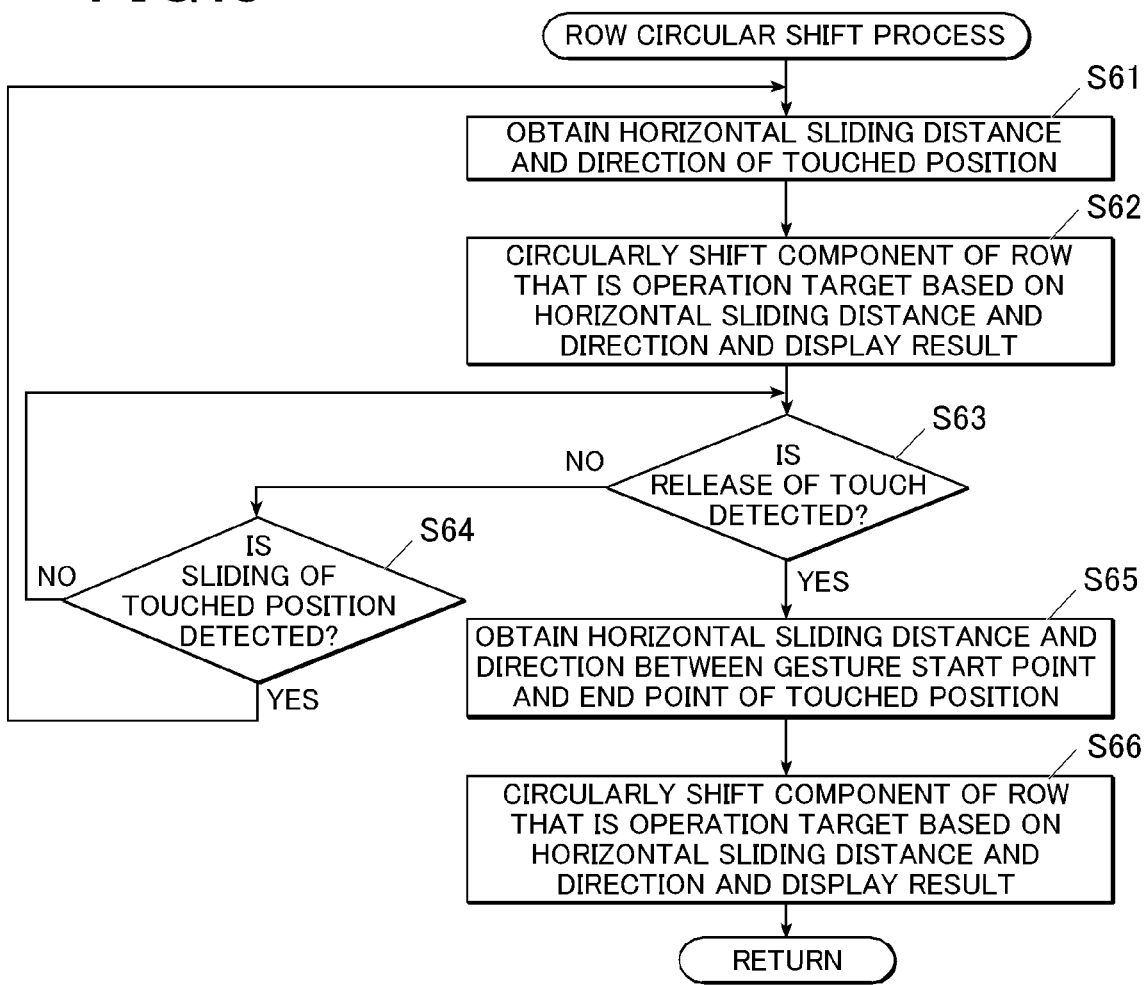
FIG. 8 is a flowchart showing a flow of a circular shift process of a row executed by the controller shown in FIG. 1.

FIG. 8 is a flowchart showing a flow of a circular shift process of a row executed in step S6 shown in FIG. 7. The circular shift process of the row is performed by the controller 11 in coordination with the scientific calculator app 121.

In the circular shift process of the row, the controller 11 calculates the sliding distance of the touched position in the horizontal direction (horizontal sliding distance sRow) and the sliding direction (right or left) (step S61). Based on the horizontal sliding distance sRow and the sliding direction, the component of the row that is the operation target in the matrix that is the operation target displayed on the display 14 is shifted circularly in the predetermined shifting amount in the predetermined direction and the result is displayed on the display 14 (step S62).

The direction and the amount that the component of the row that is the operation target is shifted circularly based on the horizontal sliding distance sRow and the sliding direction is as described above.

Next, the controller 11 determines whether the release of the finger is detected by the touch panel 131 (step S63).

When it is determined that the release of the finger is not detected by the touch panel 131 (step S63; NO), the controller 11 determines whether the sliding of the touched position is detected by the touch panel 131 (step S64).

When it is determined that the sliding of the touched position is detected (step S64; YES), the controller 11 returns the process to step S61.

When it is determined that the sliding of the touched position is not detected (step S64; NO), the controller 11 returns the process to step S63.

When it is determined that the touch panel 131 detected that the finger is released (step S63; YES), the controller 11 obtains the coordinates of the position where the finger is released as the gesture end point P2, and calculates the horizontal sliding distance sRow between the gesture start point P1 and the gesture end point P2 and the sliding direction (step S65). Then, the controller 11 circularly shifts in the predetermined shifting amount in the predetermined direction the component of the row that is the operation target in the matrix that is the operation target displayed on the display 14 based on the horizontal sliding distance sRow and the sliding direction, and displays the result on the display 14 (step S66). With this, the controller 11 ends the matrix operation process.

The direction and the amount that the component of the row that is the operation target is shifted circularly based on the horizontal sliding distance sRow and the sliding direction is as described above.

When the matrix that is the target of operation is the matrix included in the formula, the controller 11 further performs calculation of the formula again using the matrix after the circular shift. The result of the recalculation is displayed on the display 14.

In step S5 shown in FIG. 7, when it is determined that the sliding direction of the touched position is not the horizontal direction (step S5; NO), the controller 11 determines whether the sliding direction of the touched position is the vertical direction (step S8). When it is determined that the sliding direction of the touched position is the vertical direction (step S8; YES), the controller 11 performs the circular shift process of the column (step S9).

When it is determined that the sliding direction of the touched position is not the vertical direction (step S8; NO), the controller 11 ends the matrix operation process.

Figure 9:
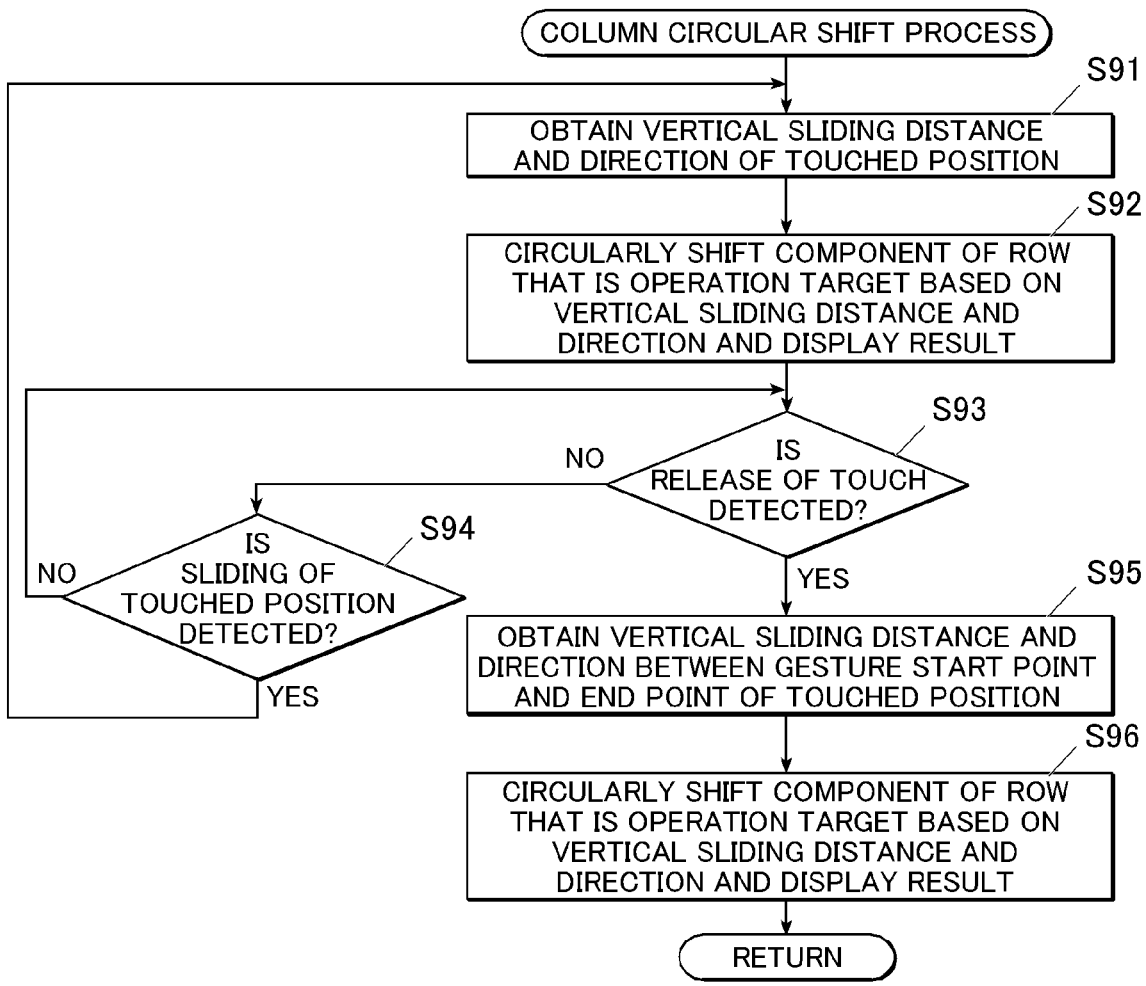
FIG. 9 is a flowchart showing a flow of a circular shift process of a column executed by the controller shown in FIG. 1.

FIG. 9 is a flowchart showing a flow of a circular shift process of a column executed in step S9 shown in FIG. 7. The circular shift process of the row is performed by the controller 11 in coordination with the scientific calculator app 121.

In the circular shift process of the column, the controller 11 calculates the sliding distance of the touched position in the vertical direction (vertical sliding distance sCol) and the sliding direction (up or down) (step S91). Based on the vertical sliding distance sCol and the sliding direction, the component of the column that is the operation target in the matrix that is the operation target displayed on the display 14 is shifted circularly in the predetermined shifting amount in the predetermined direction and the result is displayed on the display 14 (step S92).

The direction and the amount that the component of the column that is the operation target is shifted circularly based on the vertical sliding distance sCol and the sliding direction is as described above.

Next, the controller 11 determines whether the release of the finger is detected by the touch panel 131 (step S93).

When it is determined that the release of the finger is not detected by the touch panel 131 (step S93; NO), the controller 11 determines whether the sliding of the touched position is detected by the touch panel 131 (step S94).

When it is determined that the sliding of the touched position is detected (step S94; YES), the controller 11 returns the process to step S91.

When it is determined that the sliding of the touched position is not detected (step S94; NO), the controller 11 returns the process to step S93.

When it is determined that the touch panel 131 detected that the finger is released (step S93; YES), the controller 11 obtains the coordinates of the position where the finger is released as the gesture end point P2, and calculates the vertical sliding distance sCol between the gesture start point P1 and the gesture end point P2 and the sliding direction (step S95). Then, the controller 11 circularly shifts in the predetermined shifting amount in the predetermined direction the component of the column that is the operation target in the matrix that is the operation target displayed on the display 14 based on the vertical sliding distance sCol and the sliding direction, and confirms the display (step S96). With this, the controller 11 ends the matrix operation process.

The direction and the amount that the component of the column that is the operation target is shifted circularly based on the vertical sliding distance sCol and the sliding direction is as described above.

When the matrix that is the target of operation is the matrix included in the formula, the controller 11 further performs calculation of the formula again using the matrix after the circular shift. The result of the recalculation is displayed on the display 14.

In step S3 shown in FIG. 7, when it is determined that the gesture start point P1 is not within the region of the matrix displayed on the display 14 (step S3; NO), the controller 11 determines whether the gesture start point P1 is within the effective range (R21 or R22 shown in FIG. 6A and FIG. 6B) of the transposition operation set in the upper right or the lower left of the matrix (step S10).

In one embodiment, the effective range of the transposition operation may be set in the upper left or the lower right of the matrix. In this case, the controller 11 determines in step S10 whether the gesture start point P1 is within the effective range of the transposition operation set in the upper left or the lower right of the matrix.

When it is determined that the gesture start point P1 is within the effective range of the transposition operation (step S10; YES), the controller 11 determines whether the sliding of the touched position is detected by the touch panel 131 (step S11).

When it is determined that the sliding of the touched position is not detected by the touch panel 131 (step S11; NO), the controller 11 determines whether the release of the finger is detected by the touch panel 131 (step S14).

When it is determined that the release of the finger is not detected (step S14; NO), the controller 11 returns the process to step S11.

When it is determined that the release of the finger is detected (step S14; YES), the controller 11 ends the matrix operation process.

When it is determined that the sliding of the touched position is detected by the touch panel 131 (step S11; YES), the controller 11 determines whether the sliding direction of the touched position is the diagonal direction (step S12).

When it is determined that the sliding direction of the touched position is the diagonal direction (step S12; YES), the controller 11 performs the transposition process (step S13).

When it is determined that the sliding direction of the touched position is not the diagonal direction (step S12; NO), the controller 11 ends the matrix operation process.

Figure 10:
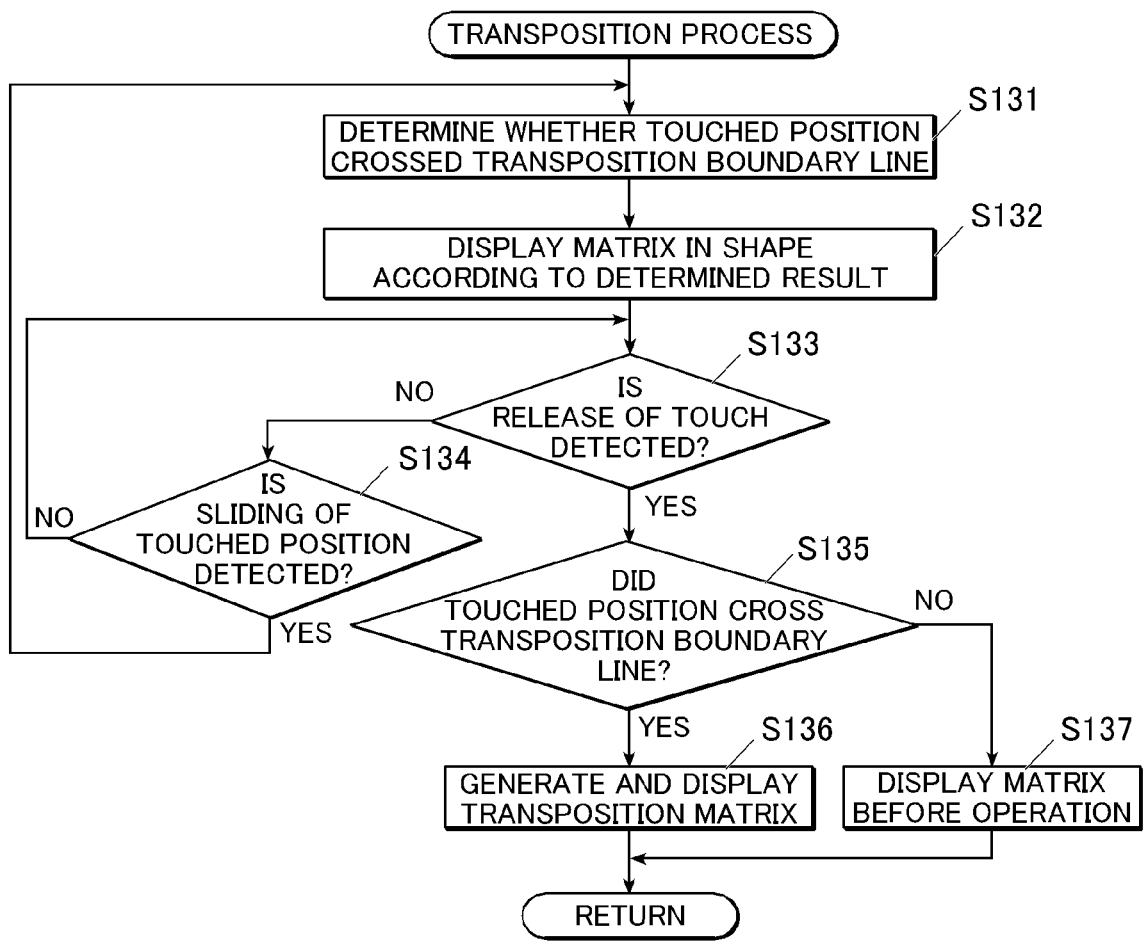
FIG. 10 is a flowchart showing a flow of a transposition process executed by the controller shown in FIG. 1.

FIG. 10 is a flowchart showing a flow of a transposition process executed in step S13 shown in FIG. 7. The transposition process is performed by the controller 11 in coordination with the scientific calculator app 121.

In the transposition process, the controller 11 determines whether the touched position after sliding crossed the transposition boundary line L1 (step S131), and displays the matrix that is the operation target in the shape according to the determined result on the display 14 (step S132).

For example, as shown in FIG. 6A and FIG. 6B, when the touched position after the sliding crossed the transposition boundary line L1, the entire matrix is displayed on the display 14 deformed diagonally (in a parallelogram shape) so that the user is able to understand that the line is crossed. When the touched position after the sliding did not cross the transposition boundary line L1, the matrix is displayed on the display 14 without changing the shape of the matrix so that the user is able to understand that the line is not crossed.

Next, the controller 11 determines whether the release of the finger is detected by the touch panel 131 (step S133).

When it is determined that the release of the finger is not detected by the touch panel 131 (step S133; NO), the controller 11 determines whether the sliding of the touched position is detected by the touch panel 131 (step S134).

When it is determined that the sliding of the touched position is detected (step S134; YES), the controller 11 returns the process to step S131.

When it is determined that the sliding of the touched position is not detected (step S134; NO), the controller 11 returns the process to step S133.

When it is determined that the touch panel 131 detected that the finger is released (step S133; YES), the controller 11 obtains the coordinates of the position where the finger is released as the gesture end point P2, and determines whether the touched position crossed the transposition boundary line L1 from the coordinates of the gesture start point P1 and the gesture end point P2 (step S135).

When it is determined that the touched position did not cross the transposition boundary line L1 (step S135; NO), the controller 11 displays the matrix before the transposition operation on the display 14 (step S137) and ends the transposition process.

When it is determined that the touched position crossed the transposition boundary line L1 (step S135; YES), the controller 11 exchanges the components of the row with the components of the column in the matrix that is the operation target, and generates the transposition matrix. The result is displayed on the display 14 (step S136), and the transposition process ends.

When the matrix that is the target of operation is the matrix included in the formula, the controller 11 further performs calculation of the formula again using the matrix after the transposition. The result of the recalculation is displayed on the display 14.

In step S10 shown in FIG. 7, when it is determined that the gesture start point P1 is not within the effective range of the transposition operation (step S10; NO), the controller 11 determines whether the sliding of the touched position is detected by the touch panel 131 (step S15).

When it is determined that the sliding of the touched position is not detected by the touch panel 131 (step S15; NO), the controller 11 determines whether the release of the finger is detected by the touch panel 131 (step S18).

When it is determined that the release of the finger is not detected (step S18; NO), the controller 11 returns the process to step S15.

When it is determined that the release of the finger is detected (step S18; YES), the controller 11 ends the matrix operation process.

When it is determined that the sliding of the touched position is detected by the touch panel 131 (step S15; YES), the controller 11 determines whether the sliding direction of the touched position is the rotating direction around the matrix center point P0 (step S16).

When it is determined that the sliding direction of the touched position is the rotating direction around the matrix center point P0 (step S16; YES), the controller 11 performs the rotating process (step S17).

When it is determined that the sliding direction of the touched position is not the rotating direction around the matrix center point P0 (step S16; NO), the controller 11 ends the matrix operation process.

Figure 11:
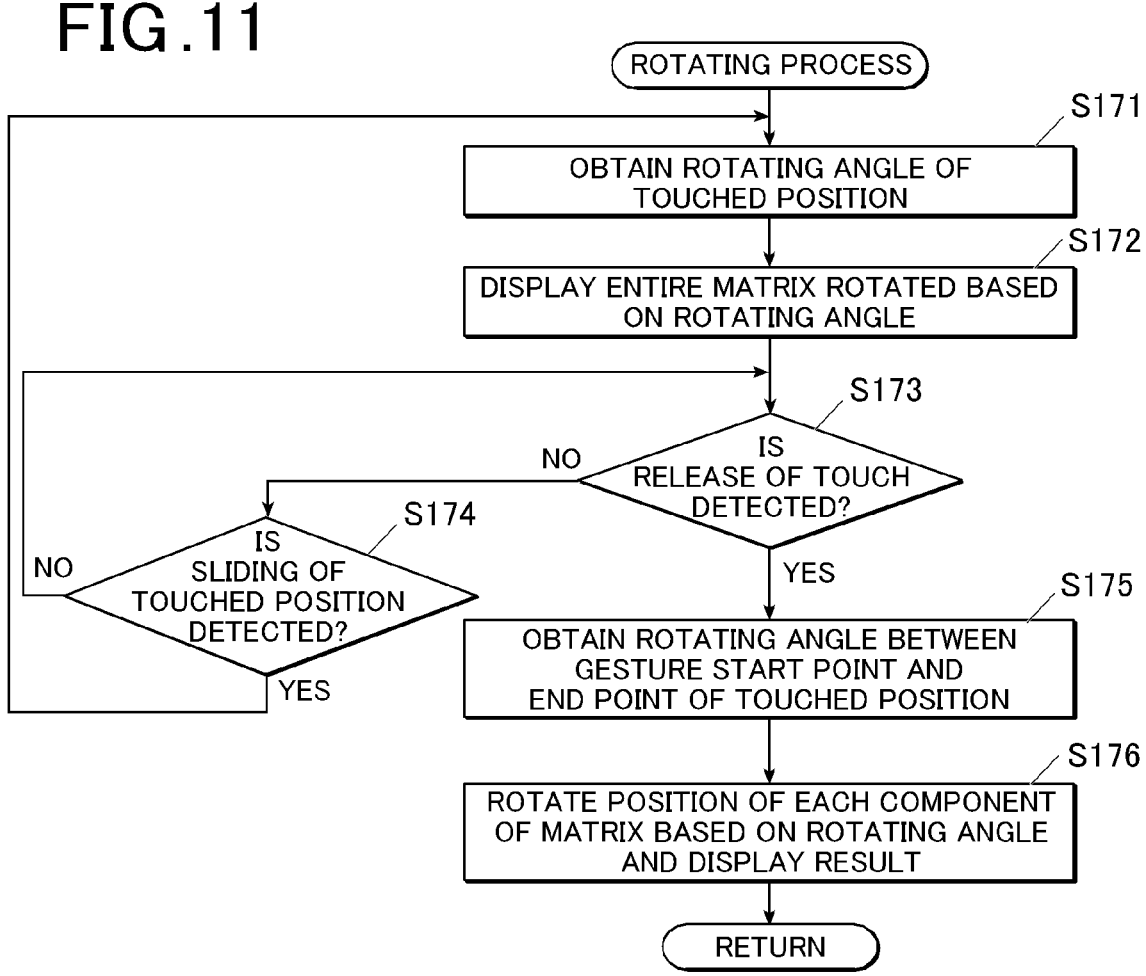
FIG. 11 is a flowchart showing a flow of a rotating process executed by the controller shown in FIG. 1.

FIG. 11 is a flowchart showing a flow of a rotating process executed in step S17 shown in FIG. 7. The rotating process is performed by the controller 11 in coordination with the scientific calculator app 121.

In the rotating process, the controller 11 calculates the rotating angle of the touched position (angle formed by the gesture start point P1, the matrix center point P0 and the touched position, counter clockwise is to be positive and clockwise is to be negative) (step S171). Then, the controller 11 rotates the entire matrix that is the operation target displayed on the display 14 a predetermined angle according to the rotated angle and displays the result (step S172).

Next, the controller 11 determines whether the release of the finger is detected by the touch panel 131 (step S173).

When it is determined that the release of the finger is not detected by the touch panel 131 (step S173; NO), the controller 11 determines whether the sliding of the touched position is detected by the touch panel 131 (step S174).

When it is determined that the sliding of the touched position is detected (step S174; YES), the controller 11 returns the process to step S171.

When it is determined that the sliding of the touched position is not detected (step S174; NO), the controller 11 returns the process to step S173.

When it is determined that the touch panel 131 detected that the finger is released (step S173; YES), the controller 11 obtains the coordinates of the position where the finger is released as the gesture end point P2, and obtains the angle formed by the gesture start point P1, the matrix center point P0, and the gesture end point P2 as the rotating angle θ (step S175). Then, the controller 11 rotates the position of each component in the matrix that is the target of operation based on the rotating angle θ, and displays the result on the display 14 (step S176). With this, the controller 11 ends the rotating process.

When the matrix that is the target of operation is the matrix included in the formula, the controller 11 further performs calculation of the formula again using the matrix after the rotating process. The result of the recalculation is displayed on the display 14.

In step S1 shown in FIG. 7, when it is determined that the touched position detected by the touch panel 131 is not within the effective range to start the gesture operation (step S1; NO), the controller 11 performs the process according to the normal operation (step S19), and ends the matrix operation process.

As described above, when the gesture operation (swipe) is performed to the matrix displayed on the display 14, since the controller 11 performs the matrix operation process, it is possible to specify whether the rotating operation is performed, whether the circular shifting operation of the row is performed, whether the circular shifting operation of the column is performed, or whether the transposition operation is performed. With this, the arrangement of the components of the matrix can be changed according to the specified operation.

As described above, the controller 11 of the electronic device 100 displays on the display 14 the matrix in which a plurality of components are arrayed, and based on the gesture operation to the matrix displayed on the display 14, the arrangement of the plurality of components in the matrix is changed.

Therefore, the advanced motion of the matrix components can be performed quickly by an intuitive operation.

The controller 11 detects the touched position touched on the display 14 with the touch panel 131, and when it is judged that the touched position is within the preset effective range to start the gesture operation to the matrix, it is determined that the gesture operation is started.

Therefore, the user is able to start the gesture operation that changes the arrangement of the plurality of components in the matrix by touching the effective range to start the gesture operation.

When the performed gesture operation is the operation to rotate the touched position a predetermined rotating angle or more around the matrix center point, the controller 11 rotates the position of each component of the matrix around the matrix center point.

Therefore, the positions of the components in the matrix can be rotated by a simple operation of rotating the touched position a predetermined rotating angle or more around the matrix center point.

The effective range to start the gesture operation for the rotating operation on the matrix is the predetermined range around the matrix. Therefore, the positions of the components in the matrix can be rotated by a simple operation of touching around the matrix and rotating the touched position a predetermined rotating angle or more.

Based on the rotated angle of the touched position, the controller 11 rotates the positions of the components of the matrix a predetermined angle around the matrix center point.

Therefore, the angle that the components of the matrix is rotated can be adjusted by adjusting the angle that the user rotates the touched position.

When the detected touched position (gesture start point) is within the effective range set in any row in the matrix and the performed gesture operation is the operation to slide the touched position in the horizontal direction, the controller 11 circularly shifts the components of the row operated in the matrix.

Therefore, the components of the touched row can be circularly shifted by the simple operation of touching and sliding horizontally any row in the matrix.

When the detected touched position (gesture start point) is within the effective range set in any column in the matrix and the performed gesture operation is the operation to slide the touched position in the vertical direction, the controller 11 circularly shifts the components of the column operated in the matrix.

Therefore, the components of the touched column can be circularly shifted by the simple operation of touching and sliding vertically any column in the matrix.

In the circular shift operation, the controller 11 shifts the components of the matrix a predetermined shifting amount in a predetermined direction based on the distance and the direction that the user slides the touched position.

Therefore, the direction that the components of the matrix is circularly shifted and the shifted amount can be adjusted by adjusting the distance and the direction that the user slides the touched position.

When the detected touched position (gesture start point) is within the effective range set in the upper right, lower right, upper left, or lower left of the matrix and the gesture operation is the operation to slide the touched position in a diagonal direction to cross the transposition boundary line L1, the controller 11 exchanges the components in the row with the components in the column of the matrix and generates the transposition matrix.

Therefore, the components in the row can be easily exchanged with the components in the column in the matrix by the operation of sliding the touched position from the upper right (or the upper left) in the direction diagonally down crossing the transposition boundary line L1 or from the lower left (or the lower right) in the direction diagonally up crossing the transposition boundary line L1.

The described contents according to the above embodiments are merely a suitable example of the matrix operation method, the electronic device and the storage medium storing the program regarding the present disclosure, and the present disclosure is not limited to the above.

Figure 12:
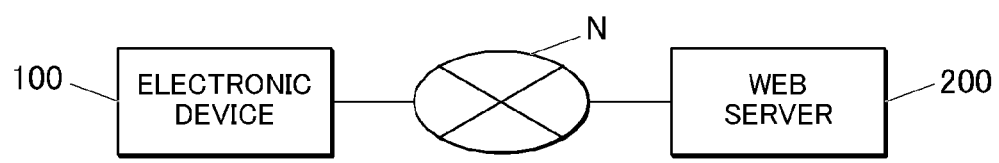
FIG. 12 is a diagram showing a situation in which an electronic device is connected to a Web server through a communication network such as the Internet.
Figure 13:
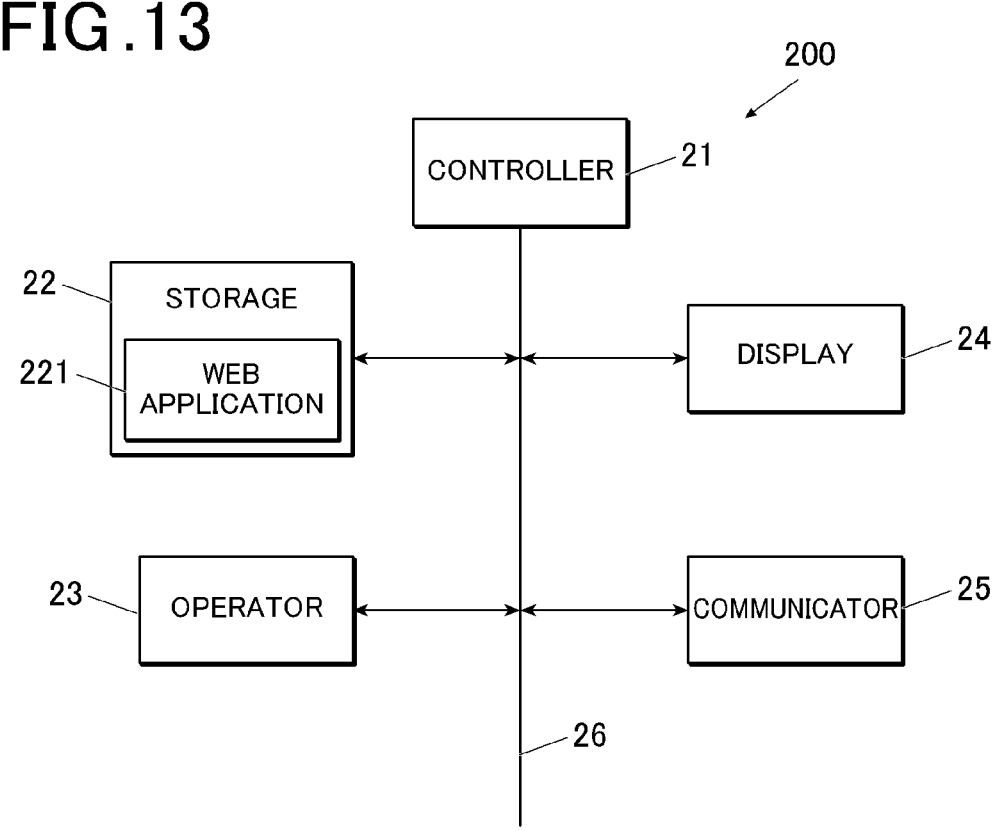
FIG. 13 is a block diagram showing a functional configuration of a Web server shown in FIG. 12.

For example, according to the above embodiments, the electronic device 100 includes the scientific calculator app 121 to perform the matrix operation method of the present disclosure. The controller 11 of the electronic device 100 performs the matrix operation method of the present disclosure in coordination with the scientific calculator app 121 included in the electronic device 100. However, the present disclosure is not limited to the above. For example, as shown in FIG. 12, the electronic device 100 may be connected to the Web server 200 through the communication network N such as the Internet, and the program to perform the matrix operation method according to the present disclosure may be a Web application 221 operating on a Web server 200. The Web server 200 may perform the Web application 221 through the Web browser provided on the electronic device 100, and the matrix operation method of the present disclosure may be performed. Here, as shown in FIG. 13, the Web server 200 includes a controller 21 that includes a CPU, a storage 22 that stores the Web application 221, an operator 23, a display 24, and a communicator 25, and the above units are connected to each other through a bus 26.

When the program to perform the matrix operation method of the present disclosure is the Web application 221, the matrix calculation corresponding to the gesture operation (above-described rotating process, circular shifting process, and transposition process) is performed by the controller 21 on the Web server 200 side in coordination with the Web application 221 stored in the storage 22. For example, on the browser side of the electronic device 100, in the screen provided by the Web application 221, the matrix is displayed according to the user operation. When the gesture operation to the matrix is detected, the values of the matrix that are to be the factors and the matrix transformation function (function of rotation, circular shifting, or transposition) are to be transmitted by the communicator 15 as a set to the Web server 200. In the Web server 200, the controller 21 performs, in coordination with the Web application 221, the calculation of the rotation, circular shift or the transposition based on the value of the matrix and the matrix transformation function received from the browser side (electronic device 100). The result is transmitted to the browser side of the electronic device 100 and the result is displayed on the screen by the browser of the electronic device 100.

For example, when the matrix rotation function is rotate (matrix value, rotating angle), the value of the matrix on the left side of the arrow in FIG. 3 is matrix A, the value of the matrix on the right side of the arrow is matrix B, and when the gesture operation to rotate the matrix A −90° is performed, the operation described below is performed.

The matrix rotation function "rotate (matrix A, −90°)" is transmitted to the Web server 200 side by the browser of the electronic device 100. The Web server 200 calculates the received matrix rotation function and transmits the result "matrix B" to the browser on the electronic device 100 side. The browser of the electronic device 100 receives the "matrix B" that is the result from the Web server 200 and displays the result.

According to the above embodiments touching is an operation to touch the screen of the display with the finger, but the touching according to the present disclosure includes operation of clicking with the mouse or touching the screen of the display with a touch pen. According to the above embodiments, the gesture operation to slide the touched position is swiping with the finger, but the gesture operation may be dragging with the mouse or sliding with the touch pen.

According to the above embodiments, a semiconductor memory such as a ROM or a hard disk can be used as the computer readable storage medium storing the program regarding the above disclosure but the examples are not limited to the above. As the computer readable medium, a SSD, a portable recording/storage medium, such as a CD-ROM, can also be used. A carrier wave is also applied as a medium providing the program data according to the present invention via a communication line.

In addition to the above, detailed configurations and detailed operation of the components of the electronic device can also be appropriately modified without departing from the scope of the present invention.

Although the embodiments of the invention have been described above, the technical scope of the invention is not limited to the embodiments described above, but is defined based on the scope of the claims. Furthermore, the technical scope of the invention includes equivalents in which modifications that are not related to the essence of the invention are added to the scope of the claims.

The invention claimed is:

1. A matrix operation method performed by a computer, the matrix operation method comprising:
controlling a display to display a matrix in which a plurality of components of the matrix are arranged in one of a plurality of rectangularly arrayed positions in one or more rows and one or more columns;
determining that a rotating gesture operation is performed, wherein the rotating gesture operation comprises:
occurrence of a user touch at a gesture start position within a preset effective range of the display, where the matrix is displayed in an area within the preset effective range;
sliding of the user touch clockwise or counter-clockwise around a predetermined point of the matrix from the gesture start position to a gesture end position; and
release of the user touch from the gesture end position; and
in response to determining that the rotating gesture operation is performed, rotating a position of the plurality of components of the matrix around the predetermined point of the matrix to a different one of the plurality of rectangularly arrayed positions.

2. The matrix operation method according to claim 1, further comprising:
determining an angle formed by the gesture start position, the predetermined point and the gesture end position is within a predetermined angular range; and
in response to determining that the angle is within the predetermined angular range, rotating the position of the each of the plurality of components of the matrix a predetermined angle around the predetermined, where the predetermined angle corresponds to the predetermined angular range.

3. The matrix operation method according to claim 1, wherein the gesture start position is a position in a range within the preset effective range not including the area in which the matrix is displayed.

4. The matrix operation method according to claim 1, wherein the display includes a touch panel.

5. The matrix operation method according to claim 4, wherein the rotating gesture operation is swiping.

6. The matrix operation method according to claim 4, wherein the rotating gesture operation is dragging.

7. The matrix operation method according to claim 1, further comprising:
before detecting release of the user touch from the gesture end position, detecting a present touch position of the user touch;
determining a present angle formed by the gesture start position, the predetermined point and the gesture end position; and
rotating the entire matrix, where the plurality of components is still arranged in the one of the plurality of rectangularly arrayed positions, by a rotation angle corresponding to the present angle.

8. A matrix operation method performed by a computer, the matrix operation method comprising:
controlling a display to display a matrix in which a plurality of components of the matrix are arranged in one of a plurality of rectangularly arrayed positions in one or more rows and one or more columns;
determining one of a row circular shifting operation is performed and a column circular shifting operation is performed,
wherein the row circular shifting operation comprises:
occurrence of a user touch at a gesture start position within a preset effective range of the display including one row of the matrix;
sliding of the user touch within the preset effective range from the gesture start position to a gesture end position; and release of the user touch from the gesture end position;
wherein the column circular shifting operation comprises:
occurrence of a user touch at a gesture start position within a preset effective range of the display including one column of the matrix;
sliding of the user touch within the preset effective range from the gesture start position to a gesture end position; and
release of the user touch from the gesture end position;
in response to determining that the row circular shifting operation is performed, circularly shifting components of the one row of the matrix horizontally such that a pushed out component pushed out of the one row is moved to a vacant position in the one row; and
in response to determining that the column circular shifting operation is performed, circularly shifting components of the one column of the matrix vertically such that a pushed out component pushed out of the one column is moved to a vacant position in the one column.

9. The matrix operation method according to claim 8, further comprising:
determining a distance and a direction in which the user touch slides from the gesture start position to the gesture end position; and
circularly shifting the component of the one row of the matrix horizontally by a predetermined shift amount in a predetermined direction, wherein the predetermined shift amount and the predetermined direction corresponds to the distance and the direction determined.

10. The matrix operation method performed by the computer according to claim 8, further comprising:
determining a distance and a direction in which the user touch slides from the gesture start position to the gesture end position; and
circularly shifting the component of the one row of the matrix vertically by a predetermined shift amount in a predetermined direction, wherein the predetermined shift amount and the predetermined direction corresponds to the distance and the direction determined.

11. A matrix operation method performed by a computer, the matrix operation method comprising:
controlling a display to display a matrix in which a plurality of components of the matrix are arranged in one of a plurality of rectangularly arrayed positions in one or more rows and one or more columns;
determining one of a first transposition gesture operation and a second transposition gesture operation is performed,
wherein the first transposition gesture operation comprises:
occurrence of a user touch at a gesture start position within a preset effective range in one of an upper right region or a lower left region of the matrix divided by a diagonal direction crossing line connecting an upper left region and a lower right region of the matrix;
sliding of the user touch from the gesture start position across the diagonal direction crossing line to a gesture end position; and
release of the user touch from the gesture end position; and
wherein the second transposition gesture operation comprises:
occurrence of a user touch at a gesture start position within a preset effective range in one of an upper left region or a lower right region of the matrix divided by a diagonal direction crossing line connecting an upper right region and a lower left region of the matrix;
sliding of the user touch from the gesture start position across the diagonal direction crossing line to a gesture end position; and
release of the user touch from the gesture end position;
in response to the transposition gesture operation being performed, generating a transposition matrix by exchanging a component of a row in one of the upper right region and the lower left region of the matrix with a component of a column in the other of the upper right region and the lower left region of the matrix; and
in response to determining that the transposition gesture operation is performed, generating a transposition matrix by exchanging a component of a row in one of the upper left region and the lower right region of the matrix with a component of a column in the other of the upper left region and the lower right region of the matrix.

12. An electronic device comprising:
an operator;
a display; and
at least one processor configured to:
control the display to display a matrix in which a plurality of components of the matrix are arranged in one of a plurality of rectangularly arrayed positions in one or more rows and one or more columns;
determine that a rotating gesture operation is performed by the operator, wherein the rotating gesture operation comprises:
occurrence of a user touch at a gesture start position within a preset effective range of the display, where the matrix is displayed in an area within the preset effective range;
sliding of the user touch clockwise or counter-clockwise around a predetermined point of the matrix from the gesture start position to a gesture end position; and
release of the user touch from the gesture end position; and
in response to the determination that the rotating gesture operation is performed, rotating a position of the plurality of components of the matrix around the predetermined point of the matrix to a different one of the plurality of rectangularly arrayed positions.

13. A non-transitory computer-readable storage medium having a program stored thereon for controlling a computer, wherein the program controls the computer to perform:
controlling a display to display a matrix in which a plurality of components of the matrix are arranged in one of a plurality of rectangularly arrayed positions in one or more rows and one or more columns;
determining that a rotating gesture operation is performed, wherein the rotating gesture operation comprises:
occurrence of a user touch at a gesture start position within a preset effective range of the display, where the matrix is displayed in an area within the preset effective range;

sliding of the user touch clockwise or counter-clockwise around a predetermined point of the matrix from the gesture start position to a gesture end position; and release of the user touch from the gesture end position; and in response to determining that the rotating gesture operation is performed, rotating a position of the plurality of components of the matrix around the predetermined point of the matrix to a different one of the plurality of rectangularly arrayed positions.

14. An electronic device comprising:

an operator;

a display; and at least one processor configured to:

control the display to display a matrix in which a plurality of components of the matrix are arranged in one of a plurality of rectangularly arrayed positions in one or more rows and one or more columns;

determine one of a row circular shifting operation is performed and a column circular shifting operation is performed by the operator, wherein the row circular shifting operation comprises:

occurrence of a user touch at a gesture start position within a preset effective range of the display including one row of the matrix;

sliding of the user touch within the preset effective range from the gesture start position to a gesture end position; and release of the user touch from the gesture end position;

wherein the column circular shifting operation comprises:

occurrence of a user touch at a gesture start position within a preset effective range of the display including one column of the matrix;

sliding of the user touch within the preset effective range from the gesture start position to a gesture end position; and release of the user touch from the gesture end position;

in response to the determination that the row circular shifting operation is performed, circularly shifting components of the one row of the matrix horizontally such that a pushed out component pushed out of the one row is moved to a vacant position in the one row; and in response to the determination that the column circular shifting operation is performed, circularly shifting components of the one column of the matrix vertically such that a pushed out component pushed out of the one column is moved to a vacant position in the one column.

15. An electronic device comprising:

an operator a display; and at least one processor configured to:

control the display to display a matrix in which a plurality of components of the matrix are arranged in one of a plurality of rectangularly arrayed positions in one or more rows and one or more columns;

determine one of a first transposition gesture operation and a second transposition gesture operation is performed by the operator, wherein the first transposition gesture operation comprises:

occurrence of a user touch at a gesture start position within a preset effective range in one of an upper right region or a lower left region of the matrix divided by a diagonal direction crossing line connecting an upper left region and a lower right region of the matrix;

sliding of the user touch from the gesture start position across the diagonal direction crossing line to a gesture end position; and release of the user touch from the gesture end position; and wherein the second transposition gesture operation comprises:

occurrence of a user touch at a gesture start position within a preset effective range in one of an upper left region or a lower right region of the matrix divided by a diagonal direction crossing line connecting an upper right region and a lower left region of the matrix;

sliding of the user touch from the gesture start position across the diagonal direction crossing line to a gesture end position; and release of the user touch from the gesture end position;

in response to the transposition gesture operation being performed, generating a transposition matrix by exchanging a component of a row in one of the upper right region and the lower left region of the matrix with a component of a column in the other of the upper right region and the lower left region of the matrix; and in response to determining that the transposition gesture operation is performed, generating a transposition matrix by exchanging a component of a row in one of the upper left region and the lower right region of the matrix with a component of a column in the other of the upper left region and the lower right region of the matrix.

16. A non-transitory computer-readable storage medium having a program stored thereon for controlling a computer, wherein the program controls the computer to perform:

controlling a display to display a matrix in which a plurality of components of the matrix are arranged in one of a plurality of rectangularly arrayed positions in one or more rows and one or more columns;

determining one of a row circular shifting operation is performed and a column circular shifting operation is performed, wherein the row circular shifting operation comprises:

occurrence of a user touch at a gesture start position within a preset effective range of the display including one row of the matrix;

sliding of the user touch within the preset effective range from the gesture start position to a gesture end position; and release of the user touch from the gesture end position;

wherein the column circular shifting operation comprises:

occurrence of a user touch at a gesture start position within a preset effective range of the display including one column of the matrix;

sliding of the user touch within the preset effective range from the gesture start position to a gesture end position; and release of the user touch from the gesture end position;

in response to the determination that the row circular shifting operation is performed, circularly shifting components of the one row of the matrix horizontally such that a pushed out component pushed out of the one row is moved to a vacant position in the one row; and in response to the determination that the column circular shifting operation is performed, circularly shifting components of the one column of the matrix vertically such that a pushed out component pushed out of the one column is moved to a vacant position in the one column.

17. A non-transitory computer-readable storage medium having a program stored thereon for controlling a computer, wherein the program controls the computer to perform:

controlling a display to display a matrix in which a plurality of components of the matrix are arranged in one of a plurality of rectangularly arrayed positions in one or more rows and one or more columns;

determining one of a first transposition gesture operation and a second transposition gesture operation is performed, wherein the first transposition gesture operation comprises:

occurrence of a user touch at a gesture start position within a preset effective range in one of an upper right region or a lower left region of the matrix divided by a diagonal direction crossing line connecting an upper left region and a lower right region of the matrix;

sliding of the user touch from the gesture start position across the diagonal direction crossing line to a gesture end position; and release of the user touch from the gesture end position; and wherein the second transposition gesture operation comprises:

occurrence of a user touch at a gesture start position within a preset effective range in one of an upper left region or a lower right region of the matrix divided by a diagonal direction crossing line connecting an upper right region and a lower left region of the matrix;

sliding of the user touch from the gesture start position across the diagonal direction crossing line to a gesture end position; and release of the user touch from the gesture end position;

in response to the transposition gesture operation being performed, generating a transposition matrix by exchanging a component of a row in one of the upper right region and the lower left region of the matrix with a component of a column in the other of the upper right region and the lower left region of the matrix; and in response to determining that the transposition gesture operation is performed, generating a transposition matrix by exchanging a component of a row in one of the upper left region and the lower right region of the matrix with a component of a column in the other of the upper left region and the lower right region of the matrix.

* * * * *